United States Patent [19]

Dewey et al.

[11] Patent Number: 5,413,494

[45] Date of Patent: May 9, 1995

[54] JACK MODULE ASSEMBLY

[75] Inventors: James D. Dewey, Plymouth; Dennis M. Burroughs, Savage, both of Minn.

[73] Assignee: ADC Telecommunications, Inc., Minneapolis, Minn.

[21] Appl. No.: 275,912

[22] Filed: Jul. 15, 1994

Related U.S. Application Data

[63] Continuation of Ser. No. 956,674, Oct. 5, 1992, abandoned.

[51] Int. Cl.[6] .................................. H01R 29/00
[52] U.S. Cl. .................................. 439/188; 439/669; 439/715
[58] Field of Search ............... 439/188, 638, 654, 709, 439/715, 540, 669; 333/260, 105; 361/390; 375/36; 200/51.04, 51.09

[56] References Cited

U.S. PATENT DOCUMENTS

| | | | |
|---|---|---|---|
| 3,109,997 | 11/1963 | Giger et al. | 333/124 |
| 3,360,747 | 12/1967 | Lancaster | 333/105 |
| 3,784,962 | 1/1974 | Byrd | 439/540 |
| 4,080,040 | 3/1978 | Lancaster | 439/669 |
| 4,368,941 | 1/1983 | Martin | 439/540 |
| 4,749,968 | 6/1988 | Burroughs . | |
| 4,815,104 | 3/1989 | Williams et al. . | |
| 4,861,281 | 8/1989 | Warner | 439/540 |

FOREIGN PATENT DOCUMENTS 0412045 2/1991 European Pat. Off. .

*Primary Examiner*—Mark Rosenbaum
*Assistant Examiner*—David P. Bryant
*Attorney, Agent, or Firm*—Merchant, Gould, Smith, Edell, Welter & Schmidt

[57] ABSTRACT

A jack module assembly includes at least two jack modules carried in a dielectric frame. The frame holds the modules in co-planar alignment. The frame has a width approximate to a width of the modules.

9 Claims, 18 Drawing Sheets

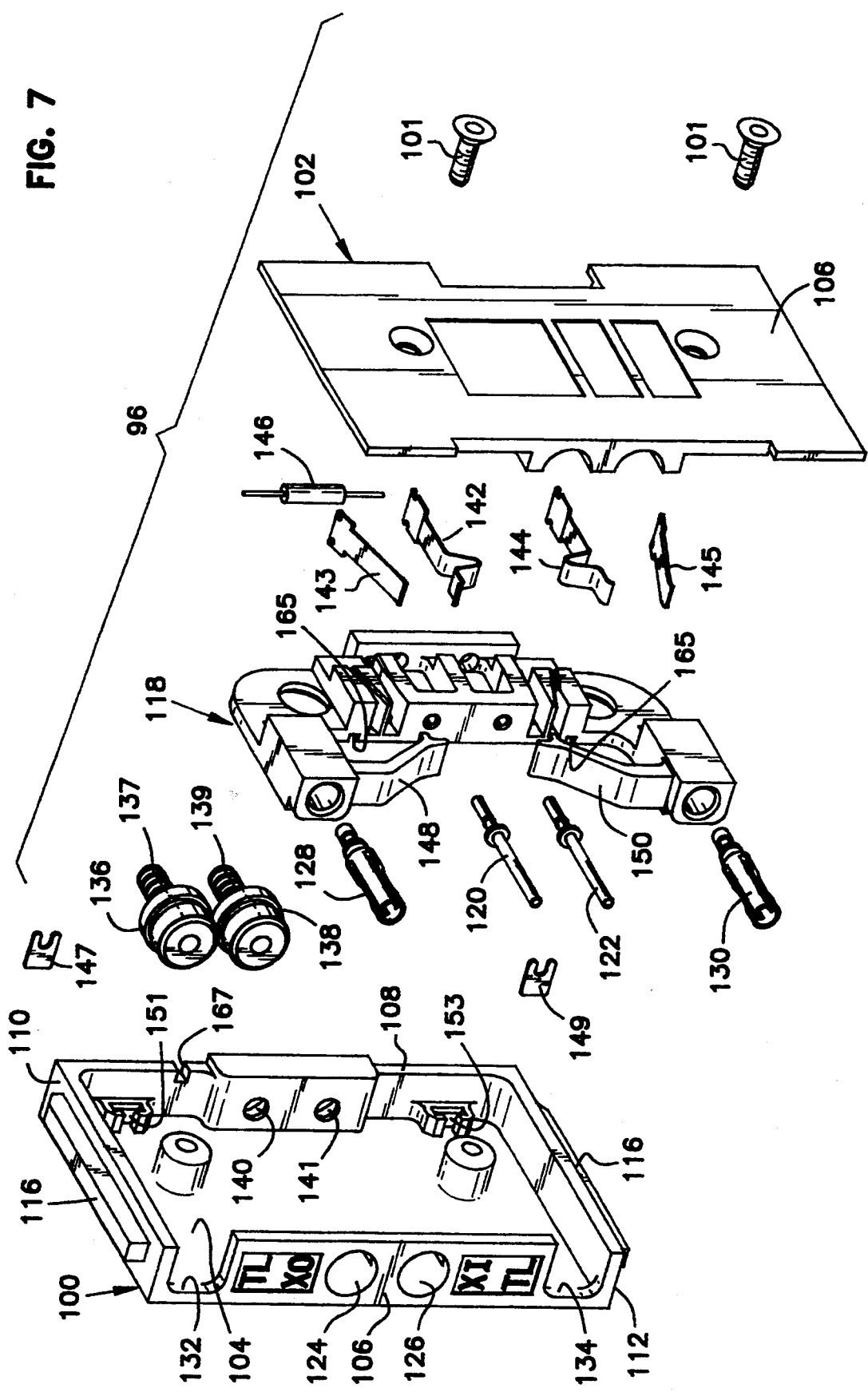

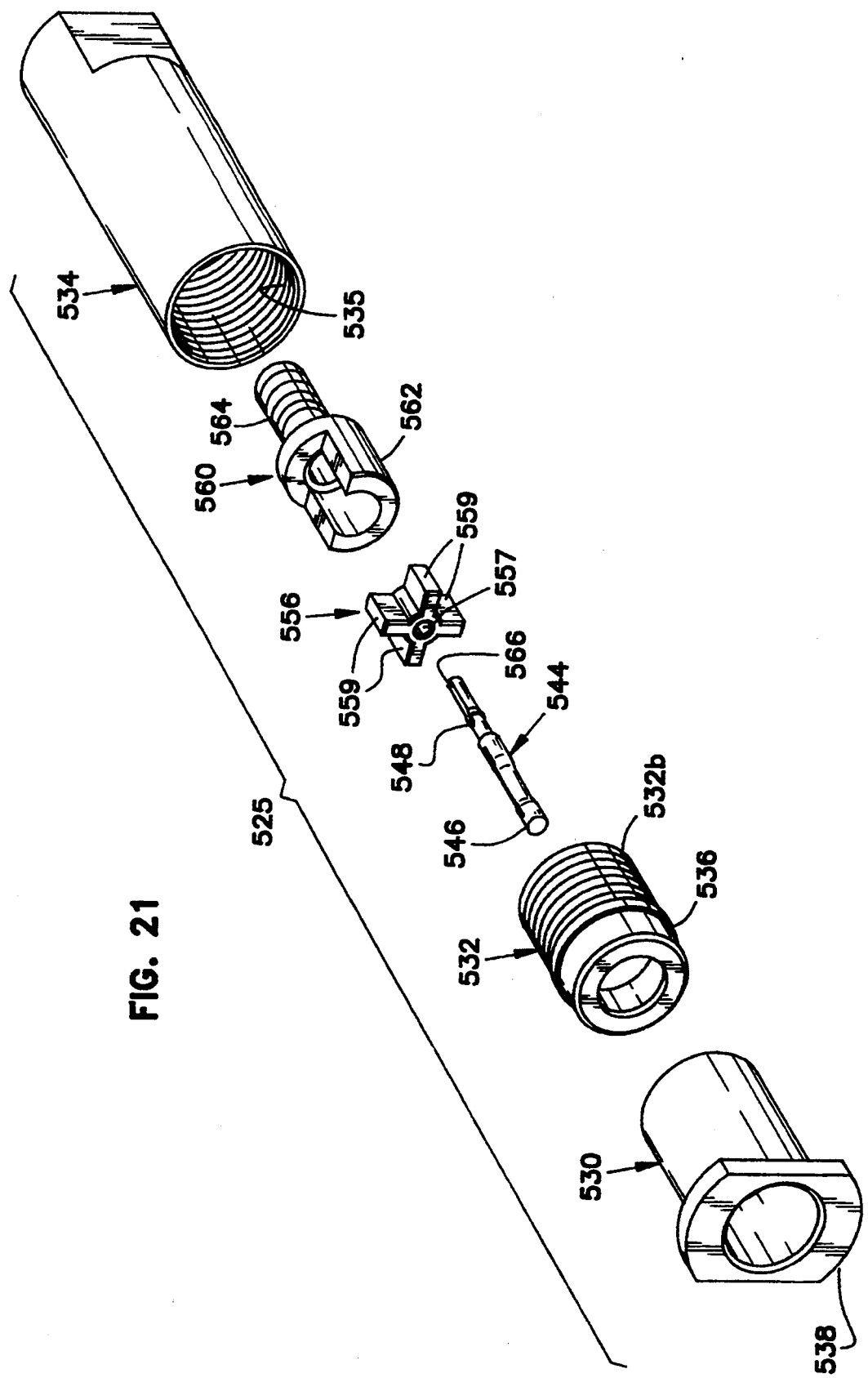

JACK MODULE ASSEMBLY

This is a continuation of application Ser. No. 07/956,674, filed Oct. 5,1992, now abandoned.

I. BACKGROUND OF THE INVENTION

1. Field of the Invention

This invention pertains to a jack module assembly for use in the telecommunications industry. More particularly, this invention pertains to such an assembly having a plurality of jack modules contained within a dielectric jack frame.

2. Description of the Prior Art

Jack module assemblies are used repeatedly in the telecommunications industry. For example, U.S. Pat. No. 4,815,104 shows a so-called DSX cross-connect module. The cross-connect module includes two jack modules. An example of a prior art jack module is shown in commonly assigned U.S. Pat. No. 4,749,968 to Burroughs. The jack modules are contained within a common housing. The housing is typically formed of sheet metal.

In addition to use of jack module assemblies in cross-connect applications, such assemblies are used in so-called DDF assemblies. U.S. patent application Ser. No. 07/742,180 shows a DDF module.

Applicants' assignee is also the assignee of U.S. patent application Ser. No. 07/859,272 filed Apr. 2, 1992. That patent application teaches an improved jack module for DS-3 signal rate applications. The jack module of the '272 application can achieve greater densities than the jack module shown in U.S. Pat. No. 4,749,968. It is an object of the present invention to utilize the jack module of U.S. patent application Ser. No. 07/859,272 in both DSX and DDF jack module assemblies to provide jack module assemblies having an enhanced density and reduced cost.

II. SUMMARY OF THE INVENTION

It is an object of the present invention to provide a jack module assembly including at least two jack modules where each of the jack modules has an electrically conductive body including first and second spaced apart side walls. The jack modules contain coax conductors accessible through forward ports on the body and connected to connectors on the rear of the body. A molded dielectric frame is provided for holding the two jacks in a predetermined alignment, with the side walls of both jacks being generally coplanar and with the molded dielectric frame having a transverse dimension not greater than the spacing between the side walls of the module. Accessible connectors are carried on the molded frame and contained within the transverse dimension. The accessible connectors are connected through coaxial cables to the connectors on the jack modules. The coaxial cables are contained within the transverse dimension of the frame.

III. BRIEF DESCRIPTION OF THE DRAWINGS

FIG. 7 is an exploded perspective view of a cross-connect module for use in the assembly of FIG. 1;

FIG. 21 is an exploded perspective view of a connector assembly for use in the present invention.

IV. DESCRIPTION OF THE PREFERRED EMBODIMENT

A. Overview of Alternative Embodiments

Referring now to the several drawing figures in which identical elements are numbered identically throughout, a description of a preferred embodiment of the present invention will now be provided.

Figure 1:
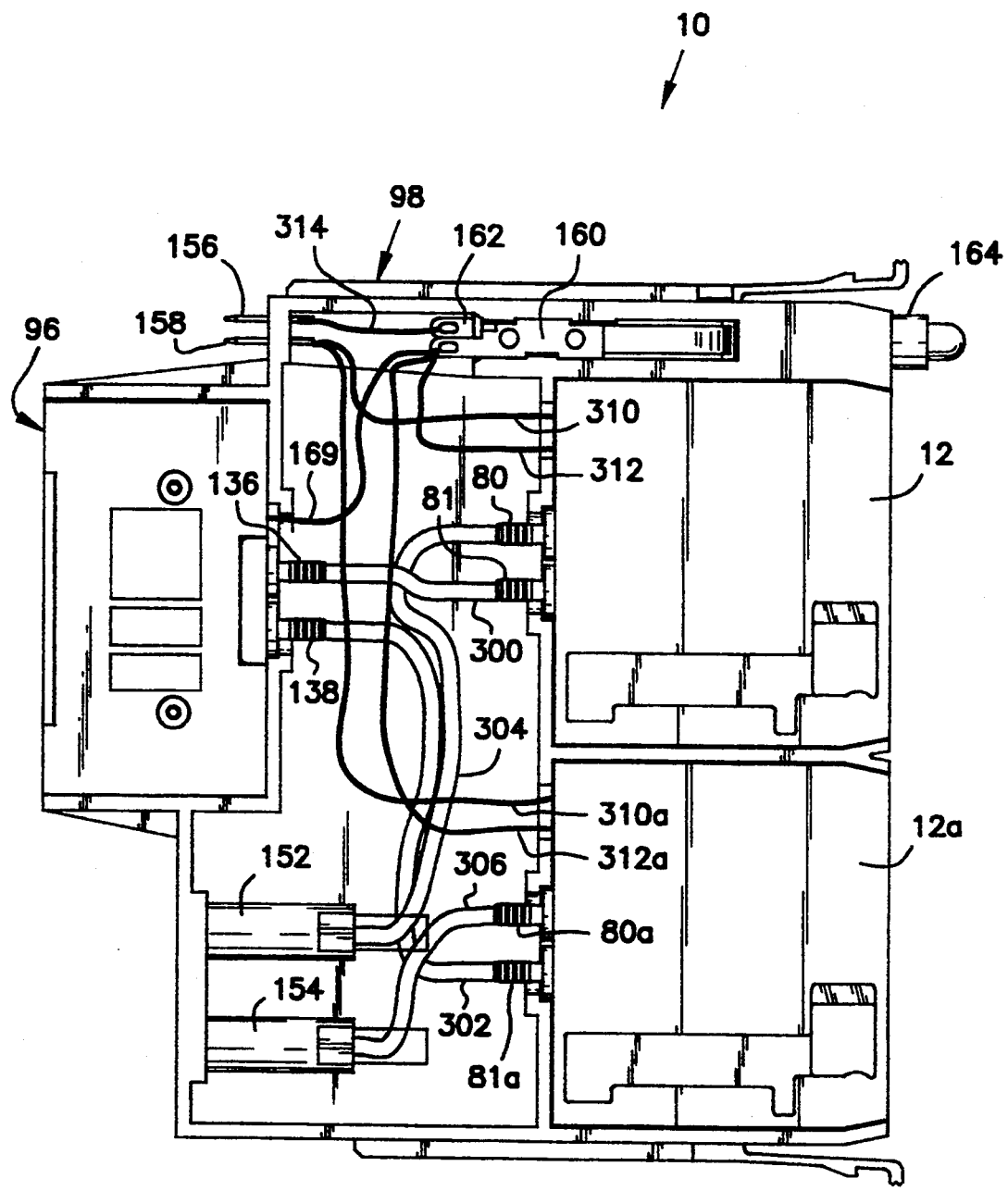
FIG. 1 is a right side elevation view of a rear cross connect jack module assembly according to the present invention.
Figure 2:
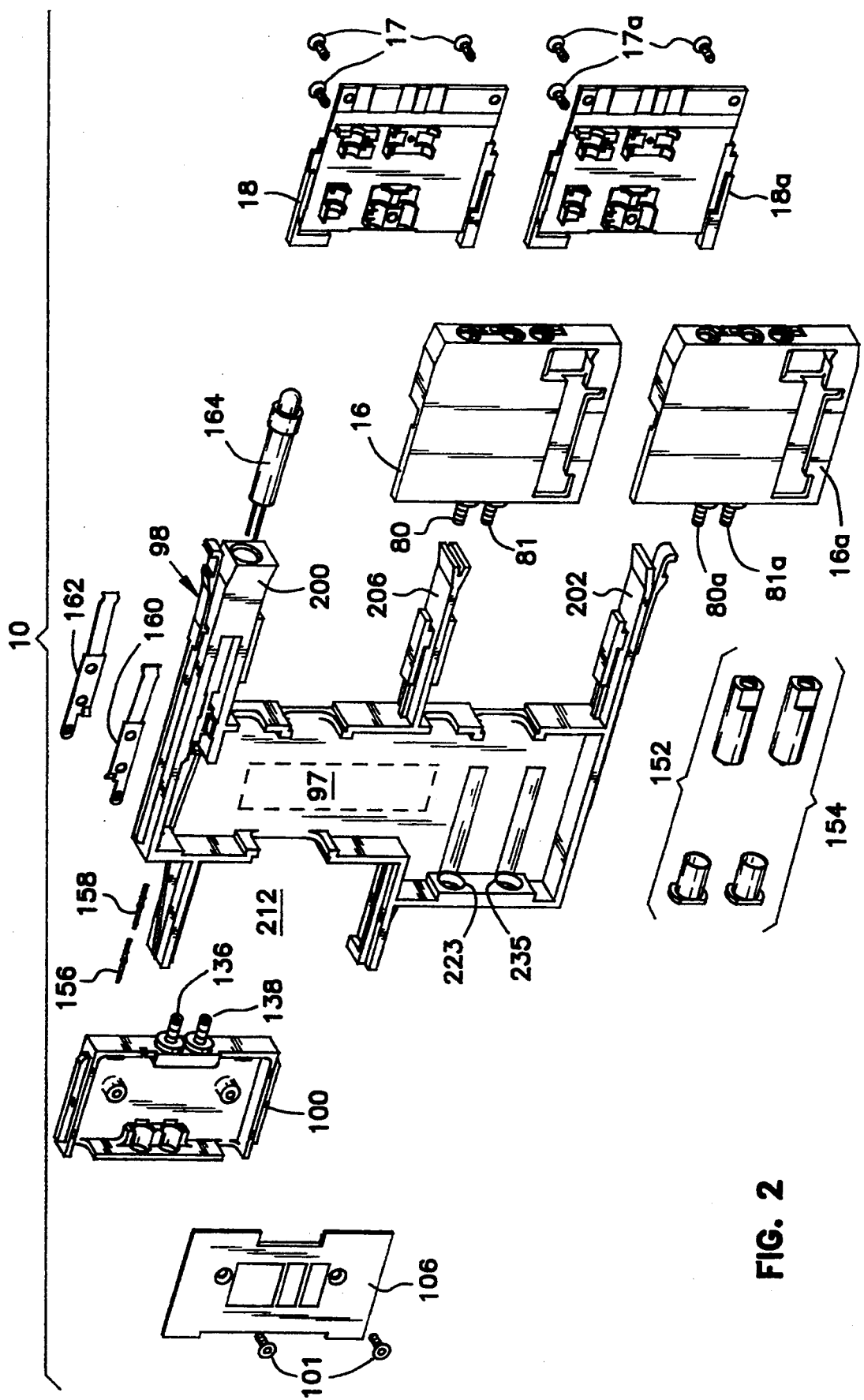
FIG. 2 is a perspective exploded view of the assembly of FIG. 1.
Figure 13:
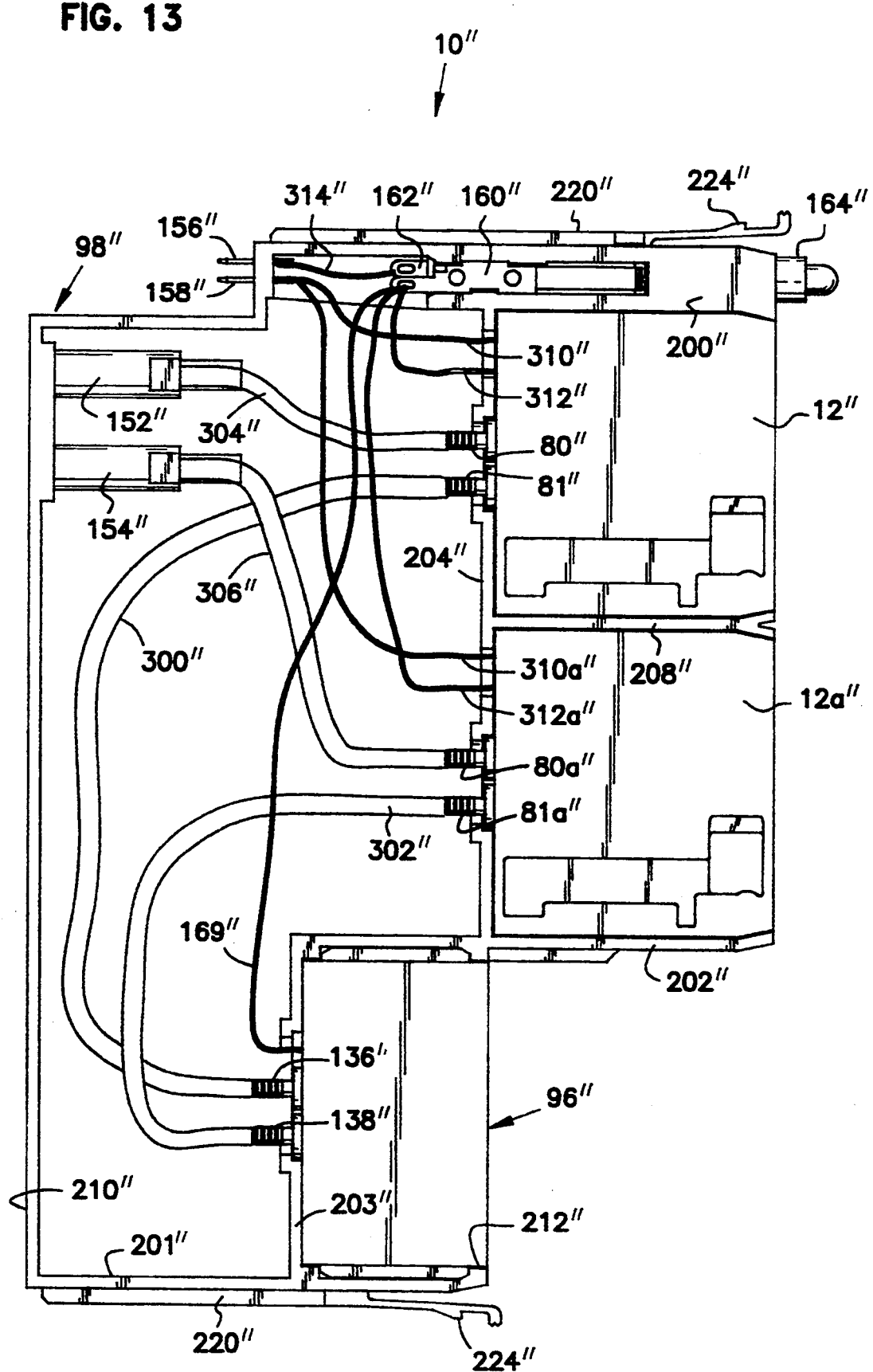
FIG. 13 is a right side elevation view of a front cross connect jack module assembly according to the present invention.
Figures 17, 18:
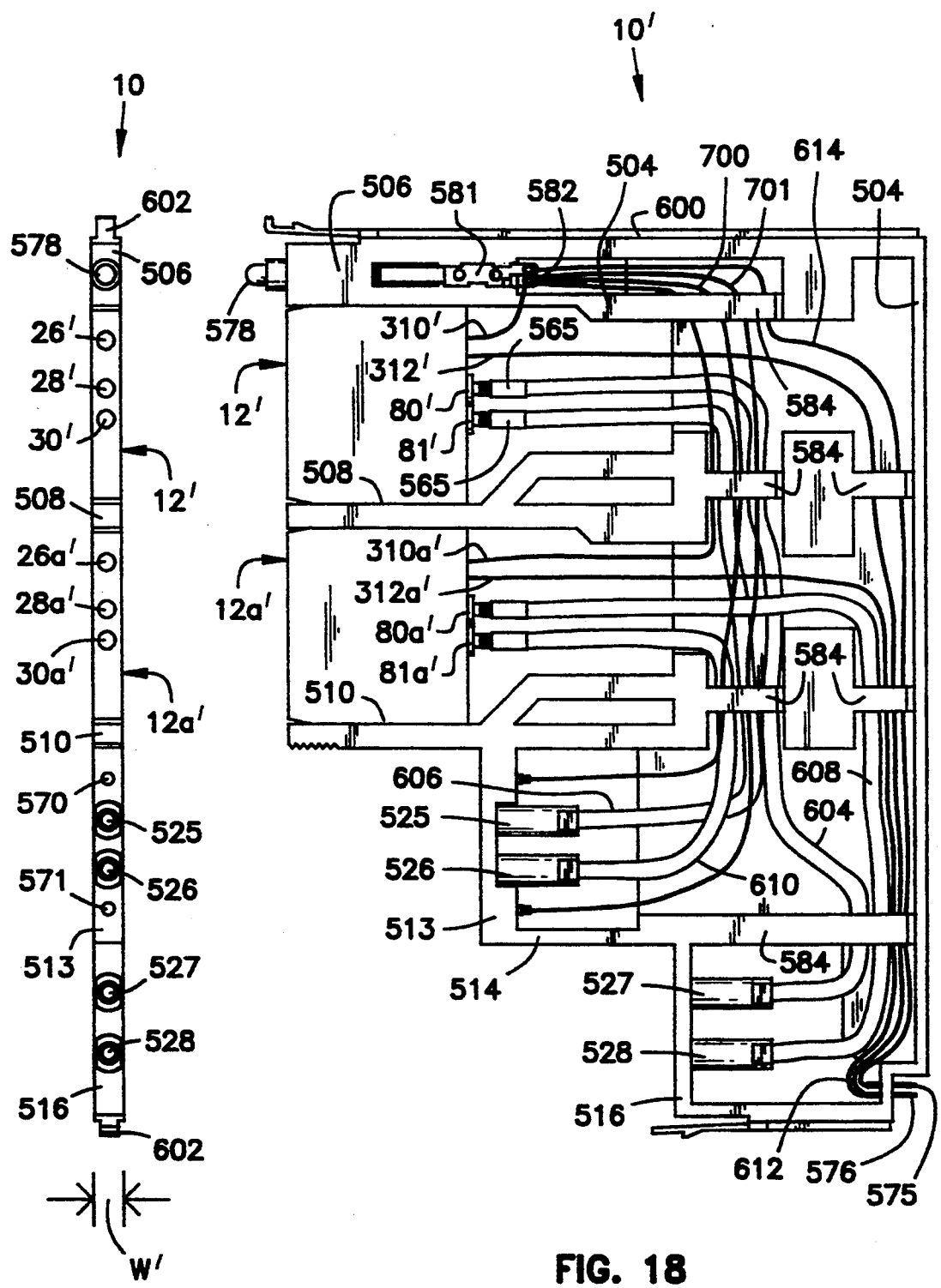
FIG. 17 is a front elevation view of the assembly of FIG. 16.
FIG. 18 is a left side elevation view of the assembly of FIG. 16.

FIG. 1 shows a DSX cross-connect jack module assembly 10 according to the present invention. FIG. 1 shows a DSX assembly 10 having rear cross-connect. FIG. 13 shows a DSX assembly 10" with forward cross-connect. FIG. 18 shows a DDF jack module assembly 10' according to the present invention While each of assemblies 10, 10', 10" will be described in detail, the assemblies utilize jack modules 12, 12', 12" and 12a, 12a', 12a", respectively B. Jack Modules Common to All Embodiments The jack modules 12, 12', 12" and 12a, 12a', 12a" are identical, and a description of one will suffice as a description of the other. Common elements of jack modules 12, 12', 12", 12a, 12a' and 12a" are numbered identically in the drawings except for the addition of an "a", "'", "''", "a'" to indicate association with modules 12a, 12', 12", 12a' or 12a", respectively .

Figure 3:
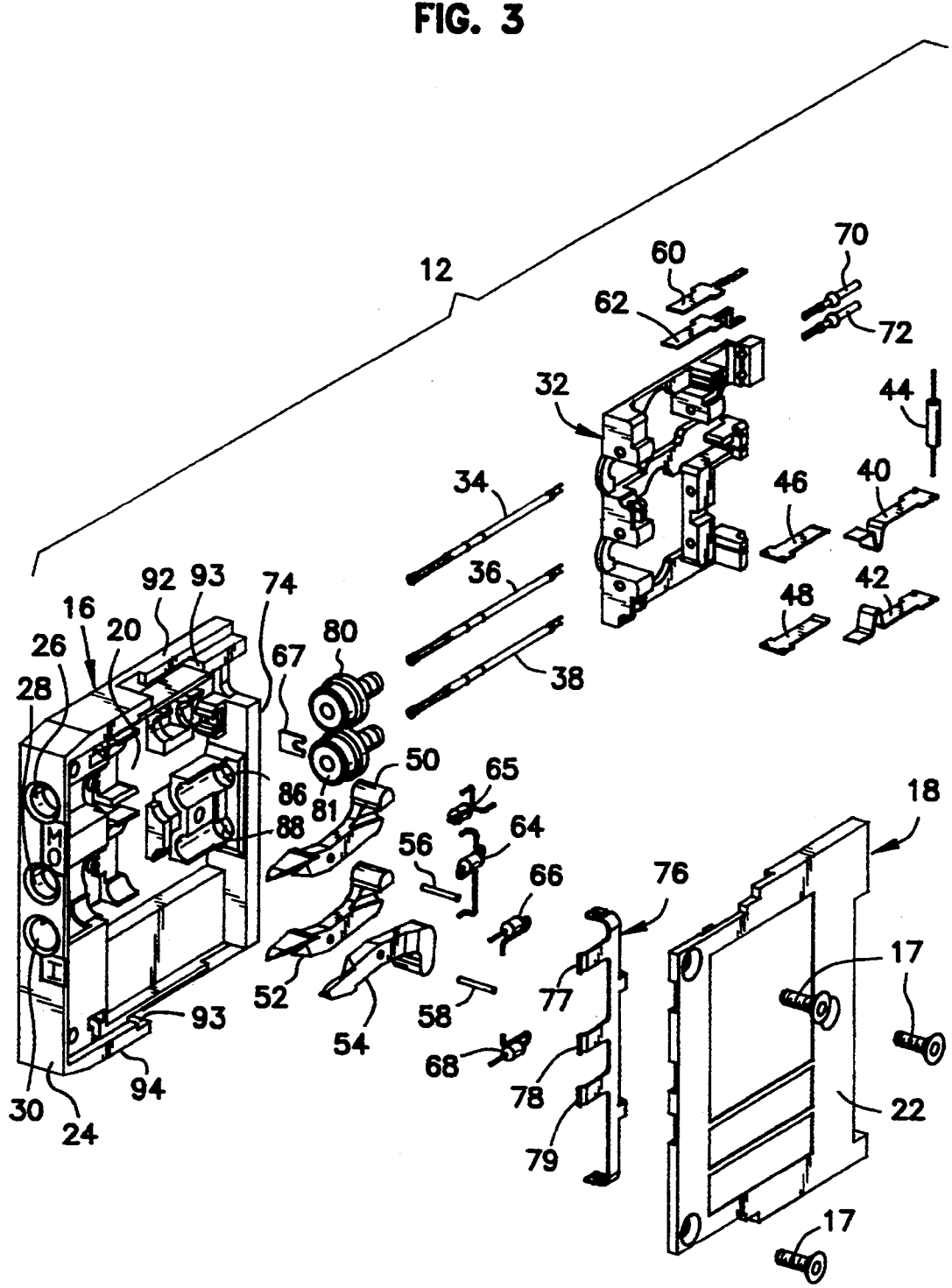
FIG. 3 is an exploded perspective view of a jack module for use in the assembly of FIG. 1.

Jack module 12 is shown in perspective exploded format in FIG. 3. Except as will be described, the jack module 12 is identical to the jack module shown and described in co-pending U.S. patent application Ser. No. 07/859,272, the specifications and drawings of which are incorporated herein by reference.

The jack module 12 includes a die-cast electrically conductive main body 16 and a die-cast electrically conductive cover 18. The cover 18 is joined to main body 16 by screws 17 to form a completed jack module body. When so assembled, the jack body includes side walls 20,22, which are parallel and spaced apart by a predetermined thickness. On a forward wall 24 of the jack body 16, a plurality of ports 26, 28, 30 are provided permitting a jack plug of predetermined size to be inserted within either of ports 26, 28, 30.

A dielectric support 32 is contained within the body 16. The support 32 receives and retains in desired alignment a plurality of coax conductors, including central coax conductors 34, 36, 38.

The conductors 34, 36,3 8 are disposed within the body 16 such that conductor 34 is engaged by a plug received within port 26. Conductor 36 is engaged by a plug received within port 28, and conductor 38 is engaged by a plug received within port 30.

Also carried on dielectric support 32 are leaf springs 40, 42. Spring 40 is biased into contact with coax conductor 36. Spring 42 is biased into contact with conductor 38. Springs 40, 42 are electrically connected by an inductor 44. Normal springs 46, 48 are also carried on support 32.

A plurality of cams 50, 52, 54 are mounted to housing 16 on pivot pins 56, 58. The cams 50, 52, 54, springs 40, 42, and normal springs 46, 48 are mutually aligned such that cam 52 urges spring 40 away from conductor 36 and into electrical engagement with spring 46 upon insertion of a plug into port 28. Spring 42 is urged by cam 54 away from conductor 38 and into electrical contact with normal spring 48 upon insertion of a plug into port 30. Monitor springs 60, 62 are also carried on support 32 and positioned to be urged into electrical contact by cam 50 upon insertion of a plug into port MONITOR 26.

Conductor 34 is connected to conductor 36 across a resistor 64. A resistor 65 connects conductor 34 to a clip 67 which is secured to body 16 in an electrically conductive manner. Spring 46 is connected to the electrically conductive body 16 across a resistor 66 connected to a main grounding clip 76. Spring 48 is connected to body 16 by a resistor 68 connected to clip 76.

Tracer lamp pins 70, 72 are carried on support 32 and extend through a rear wall 74 of housing 16. The pins 70, 72 are electrically connected to springs 60, 62, respectively.

The grounding clip 76 is mounted on body 16 for electrically communication with electrically grounded body 16. The clip 76 has contacts 77–79 disposed to engage the jacket of a coaxial plug inserted into ports 26, 28, 30, respectively.

Thus far described, jack module 12 is identical to that shown in U.S. patent application Ser. No. 07/859,272. As shown in that application, the interior surfaces of body 16 and housing 18 are contoured. The body 16 and cover 18 may be connected to an electrical ground.

The contours of the body 16 and cover 18 are selected such that the contours provide grounded coaxial shielding for the conductors 34, 36, 38. The inductor 44 as well as the other components of jack module 12 are selected such that the module 12 has a desired impedance. Selection of the inductance as well as the selection of the geometry of the surface contours provide for the desired impedance of the jack module 12 while retaining desired coaxial shielding. The selection of such components and geometries is described more fully in the aforementioned U.S. patent application Ser. No. 07/859,272.

In the aforementioned U.S. patent application Ser. No. 07/859,272, slidable connectors are provided on the rear wall of the jack module. Jack module 12 differs in this respect by providing crimp connectors 80, 81. The crimp connectors 80, 81 are identical and a description of one will suffice as a description of the other.

Figure 9:
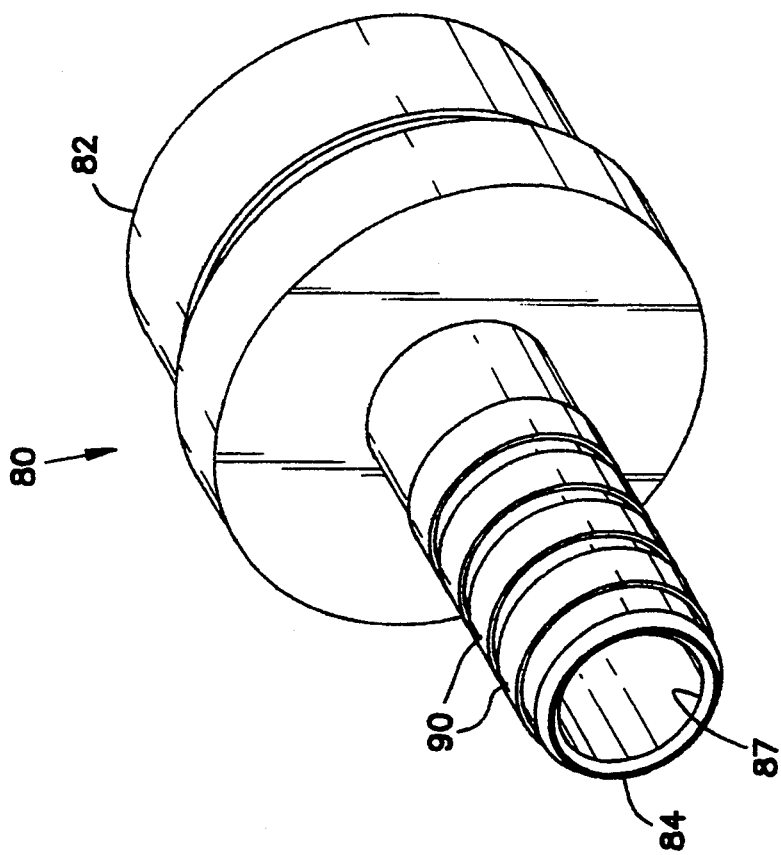
FIGS. 8 and 9 are perspective views of the crimp ferrule for use in the assembly of FIG. 1.
Figure 8:
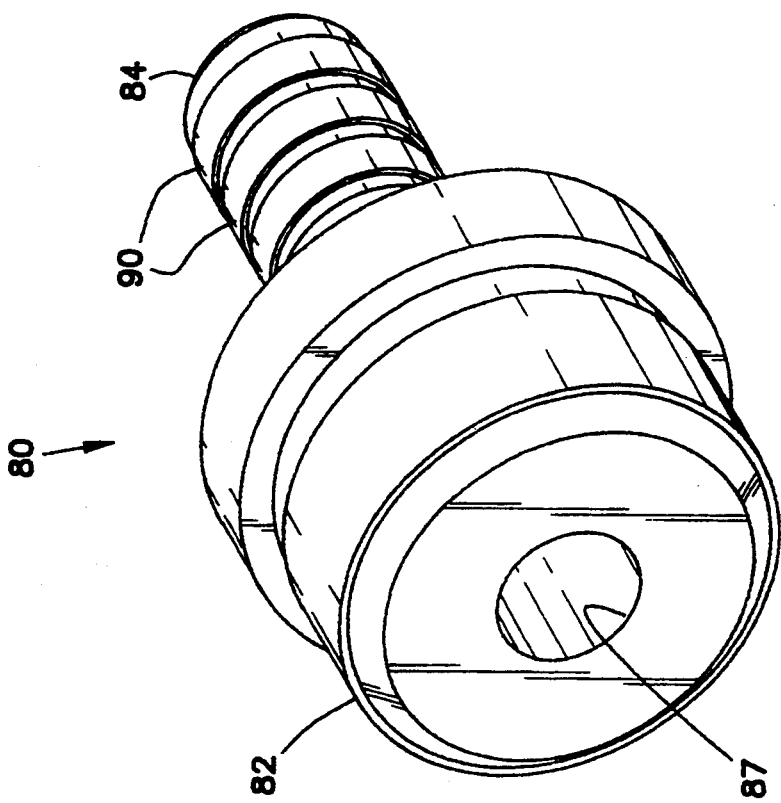

Crimp connector 80 is shown best in FIGS. 8 and 9. The connector 80 includes a base 82 and a reduced diameter crimping end 84. The base 82 is received within housing 16 with reduced diameter portion 84 extending through ports 86, 88 in rear wall 74 (see FIG. 3).

A coaxial cable may be connected to crimp 80. As is well known, coaxial cables include a central conductor surrounded by a grounding shield, with the conductor carried within a protective dielectric sheathing. The coaxial cable may be connected to the crimp by stripping the cable to expose a length of the central conductor of the cable. The central conductor may be passed through a bore 87 formed through crimp connector 80.

With respect to connector 80, the conductor passed through the port 87 may then be connected to conductor 36 by solder. Similarly, a conductor extended through the bore of connector 81 may be connected to conductor 38. The shield of the cable is disposed surrounding the outer surface of crimp end 84.

The outer surface is provided with ribs 90 (see FIGS. 8, 9) for a solid crimp. A crimp sleeve (not shown in all of the drawings but conventional in a crimp connection and shown in FIGS. 16 and 19 as item 565 for purposes of illustration) is placed over the crimp end 84, with the shield disposed between the crimp sleeve and crimp end 84. By crimping on the crimp sleeve, the grounded shield is securely connected to the electrically conductive crimp 80. As a result, the electrically conductive body and cover 16, 18 are electrically connected to the grounded shielding of the coaxial cable.

Each of the jack modules 12, 12a,12', 12a', 12'', 12a'' includes top wall 92 and bottom wall 94. The walls are provided with attachment grooves 93, the function of which will be described.

C. Detailed Description of First Embodiment

1. Overall Description

With reference now to FIG. 1, a DSX module jack assembly 10 is shown for a cross-connect application. The module 10 includes jack modules 12, 12a and a cross-connect module 96 which will be more fully described. The assembly 10 also includes a dielectric frame 98.

2. Detail of Cross-Connect Module

With best reference to FIG. 7, the cross-connect module 96 is shown in exploded perspective format. Cross-connect module 96 includes a main body 100 and a cover 102 secured thereto by screws 101. Each of body 100 and cover 102 is electrically conductive (preferably die-cast zinc like body 16 and cover 18).

The main body 100 and cover 102 cooperate to define a cross-connect module body having a first side wall 104 and a second side wall 106. Side walls 104, 106 are parallel and spaced apart equal to the spacing of the side walls 20, 22 of jack module 12.

The body 100 also includes a forward wall 106, a rear wall 108, a top wall 110, and a bottom wall 112. Top and bottom wall 110, 112 include rails 116 for attaching the cross-connect module 96 to frame 98, as will be described.

A dielectric support 118 is positioned within the body 100. The support 118 carries conductors 120, 122. Ports 124, 126 (referred to as Cross-Connect OUT and Cross-Connect IN ports, respectively or simply "XO", "XI", respectively) are formed through wall 106. The conductors 120, 122 are disposed to receive a plug (not shown) inserted within either of ports 124, 126. Tracer lamp jacks 128, 130 are also carried in support 118. The tracer lamp jacks 128, 130 are exposed through cutouts 132, 134 (labelled "TL") formed in wall 106.

Crimp ferrules 136, 138 (each identical to crimp 80) are disposed within body 100, with crimp portions 137, 139 extending through holes 140, 141 formed in wall 108. The central conductors of coax cables connected to crimps 136, 138 are connected to conductors 120, 122, respectively.

The support 118 carries normal spring contacts 142, 144. Spring 142 is biased into electrical connection with conductor 120. Spring 144 is biased into electrical contact with conductor 122. An inductor 146 electrically connects contacts 142, 144. The support 118 also carries termination spring contacts 143, 145. The termination spring contacts 143, 145 are disposed to be contacted by normal spring contacts 142, 144, respectively, upon insertion of a plug into ports 124, 126, respectively.

The dielectric support 118 is provided with integrally molded, resiliently biased, cam clips 148, 150. Upon insertion of a plug within port 124, electrical contact will be between the plug and conductor 120. The plug will urge cam 148 to force spring 142 away from electrical contact with contact 120. Simultaneously, spring 142 contacts spring 143. Similarly, insertion of a plug into port 126 makes electrical contact with contact 122 and urges cam 150 to urge spring 144 away from contact 122 with spring 144 urged against spring 145.

Termination springs 143, 145 are electrically connected to grounded body 100 by means of ground clips 147, 149 (see FIG. 7) which are press fit into pockets 151, 153 formed on body 100. Spring 143 is connected to clip 147 by a conductor 155 and resistor 157 (see FIG. 10). Similarly, spring 145 is connected to clip 149 by a conductor 159 and resistor 161.

The body 100 and cover 102 provide grounded shielding for conductors 120, 122. Inductor 146 and the other components of module 96 are selected for a desired impedance in the manner described in U.S. patent application Ser. No. 07/859,272.

3. Circuit of the Rear Cross-Connect DSX Embodiment

In the embodiment shown in FIG. 1, a coaxial cable 300 connects crimp ferrule 136 with crimp 81 on module 12. A coaxial cable 302 connects crimp 138 with crimp 81a on module 12a.

Coaxial connectors (or plug assemblies) 152, 154 are provided carried on the frame 98. Connectors 152, 154 have the structure described with reference to the plug assembly 525 described in this specification in the section entitled "IV.E.3. Plug Assembly Detail", infra. A coaxial cable 304 connects connector 152 with crimp 80 on module 12. Similarly, a coaxial cable 306 connects connector 154 with crimp 80a on module 12a.

Tracer lamp pins 156, 158 extend from the frame 98. The pins 156, 158 connect to tracer lamp springs 160, 162, which are in electrical contact with a removable tracer lamp 164.

Figure 10:
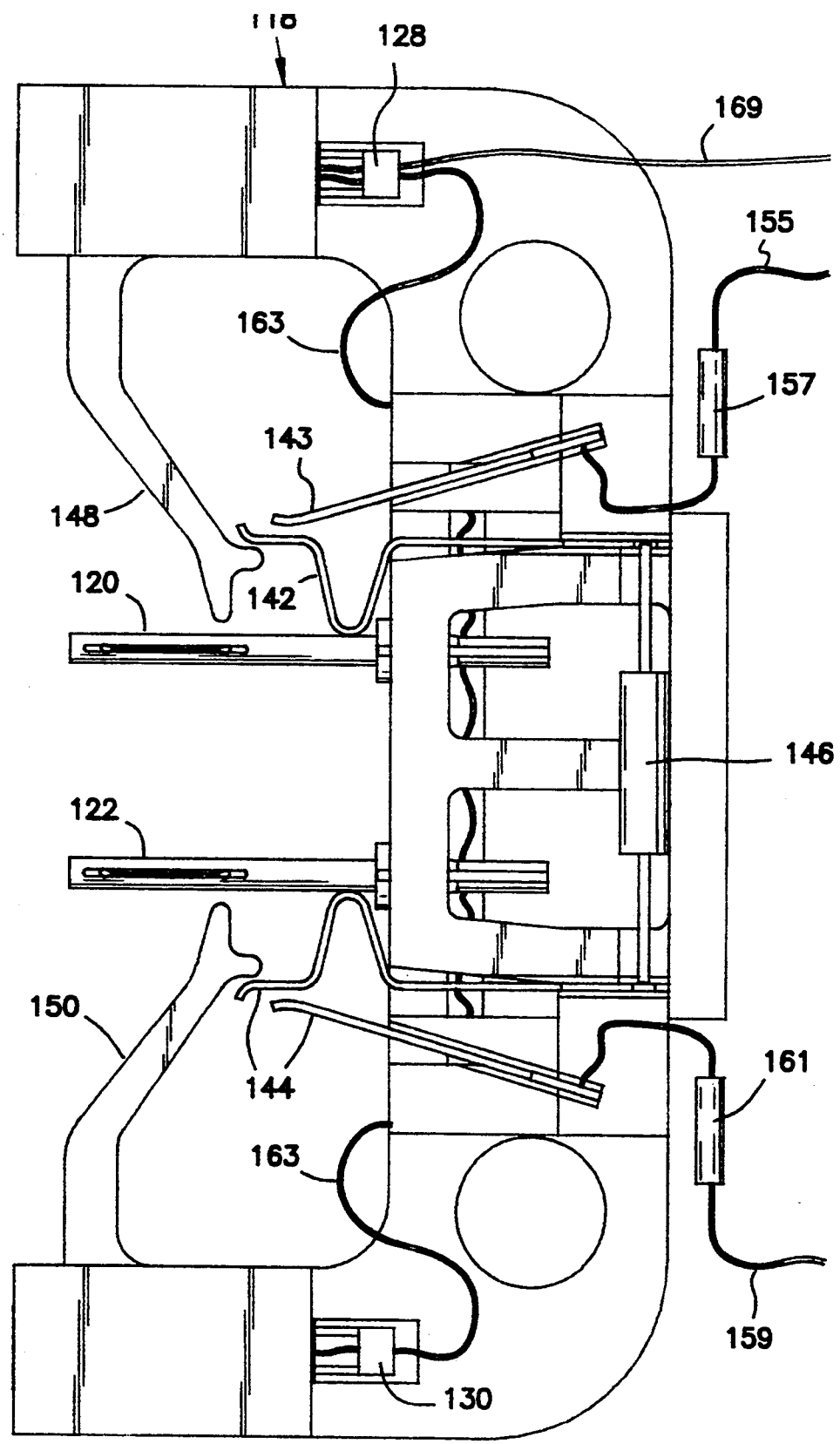
FIG. 10 is a top plan view of an assembly including an insert for use in the cross-connect module of FIG. 7.

A conductor 163 connects tracer lamp jacks 128, 130 (see FIG. 10). As shown in FIG. 7, a groove 165 is formed in support 118 through which conductor 163 is routed. A conductor 169 (see FIG. 10) is also connected to jack 128 and exits the module 96 through a groove 167 (FIG. 7) in wall 108 of body 100.

Conductor 169 is connected to spring 160. Conductors 310, 312 are connected to pins 70, 72, respectively, of module 12 and are further connected to pin 158 and spring 160, respectively. Similarly, conductors 310a, 312a are connected to the tracer lamp pins of module 12a and are further connected to pin 158 and spring 160, respectively. Finally, a conductor 314 connects spring 162 with pin 156.

Figure 4:
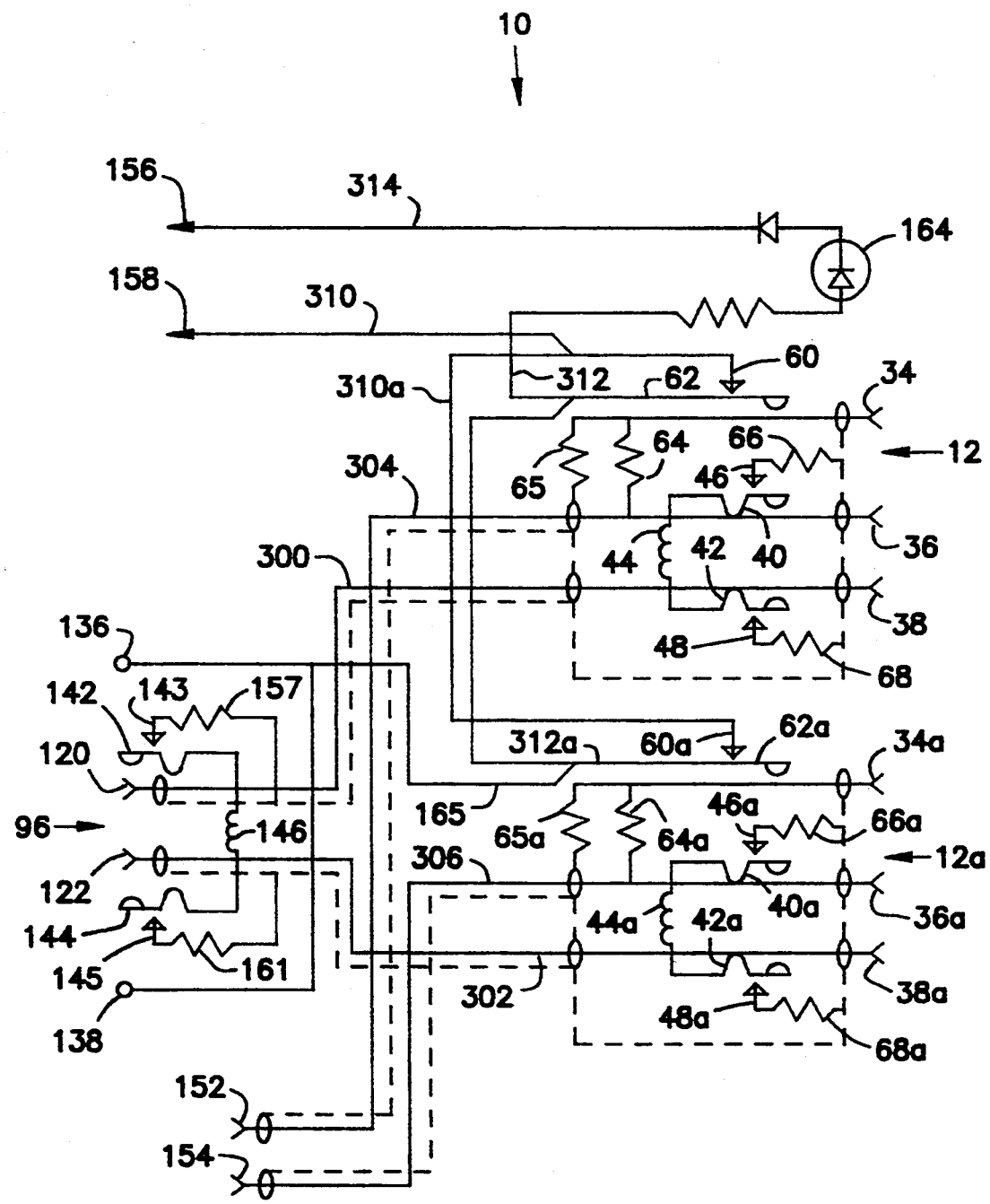
FIG. 4 is an electrical schematic of the circuitry of the assembly of FIG. 1.

The circuit thus described has the schematic shown in FIG. 4. It will be recognized that the circuit described may be used in a cross-connect or interconnect application.

Figure 4A:
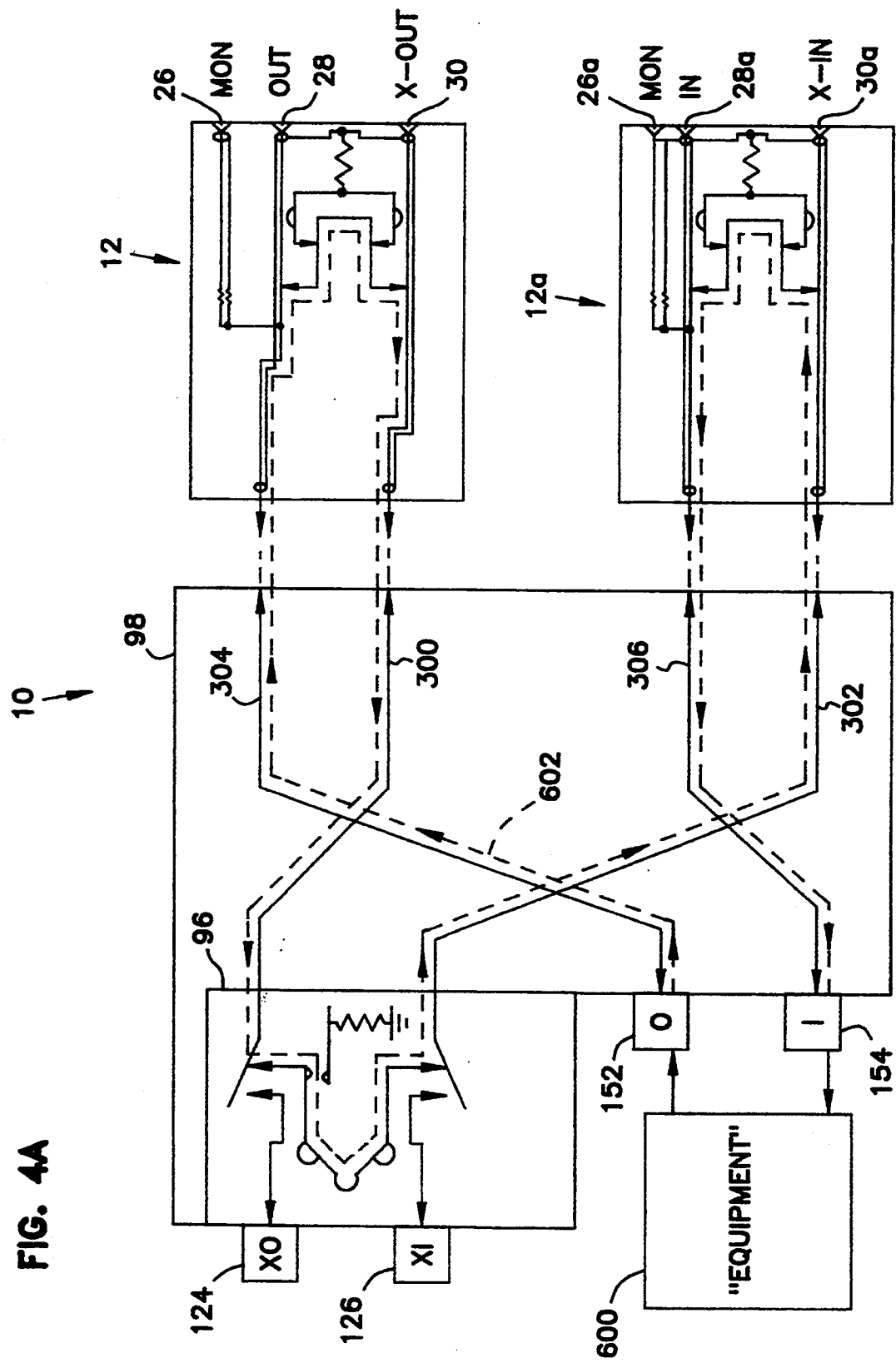
FIG. 4a is a further schematic representation of the assembly of FIG. 1.

With best reference to FIG. 4a, the reader will note that the assembly 10 performs as a cross-connect module. In FIG. 4a, the ports of jack 12 are labeled as the monitor, OUT and cross-connect OUT ports as is conventional in DSX cross-connect circuitry. Module 12a has ports labeled monitor, IN and cross-connect IN as is conventional. Ports 124 and 126 of module 96 are identified as the cross-connect OUT and cross-connect IN ports, respectively and connectors 152, 154 are the OUT and IN ports as is conventional in digital signal cross-connect. Telephone communications equipment 600 is connected to the OUT port 152. The IN port 154 is connected to the IN port (not shown) of a separate module 10 which has its OUT port 152 connected to an additional piece of telephone communications equipment as is conventional in cross-connect applications. With the foregoing application as shown in FIG. 4A, the signals passing from the equipment 600 is shown by a signal path 602. With the absence of a patch cord inserted within ports 124, 126 or in either of the OUT, cross-connect OUT, IN, or cross-connect IN ports of module 12, 12a, the signal 602 passes through the assembly 10 and exits the IN port 154. Upon insertion of a patch cord into either of ports 124, 126, 28, 30, 28a or 30a, the signal is interrupted for cross-connecting, access or testing purposes as is conventional in DSX circuitry.

4. Description of Frame of DSX Rear Cross-Connect Embodiment

Figure 6:
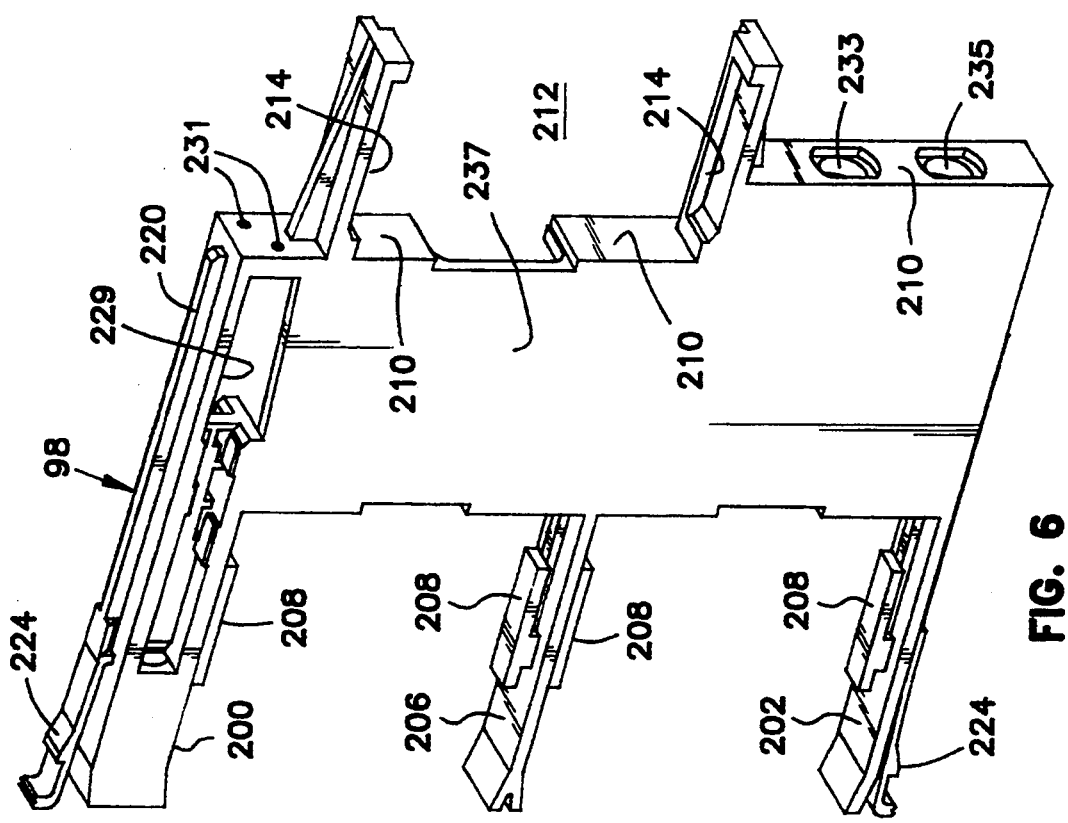
FIG. 6 is a left side, top and rear perspective view of the frame FIG. 5.
Figure 5:
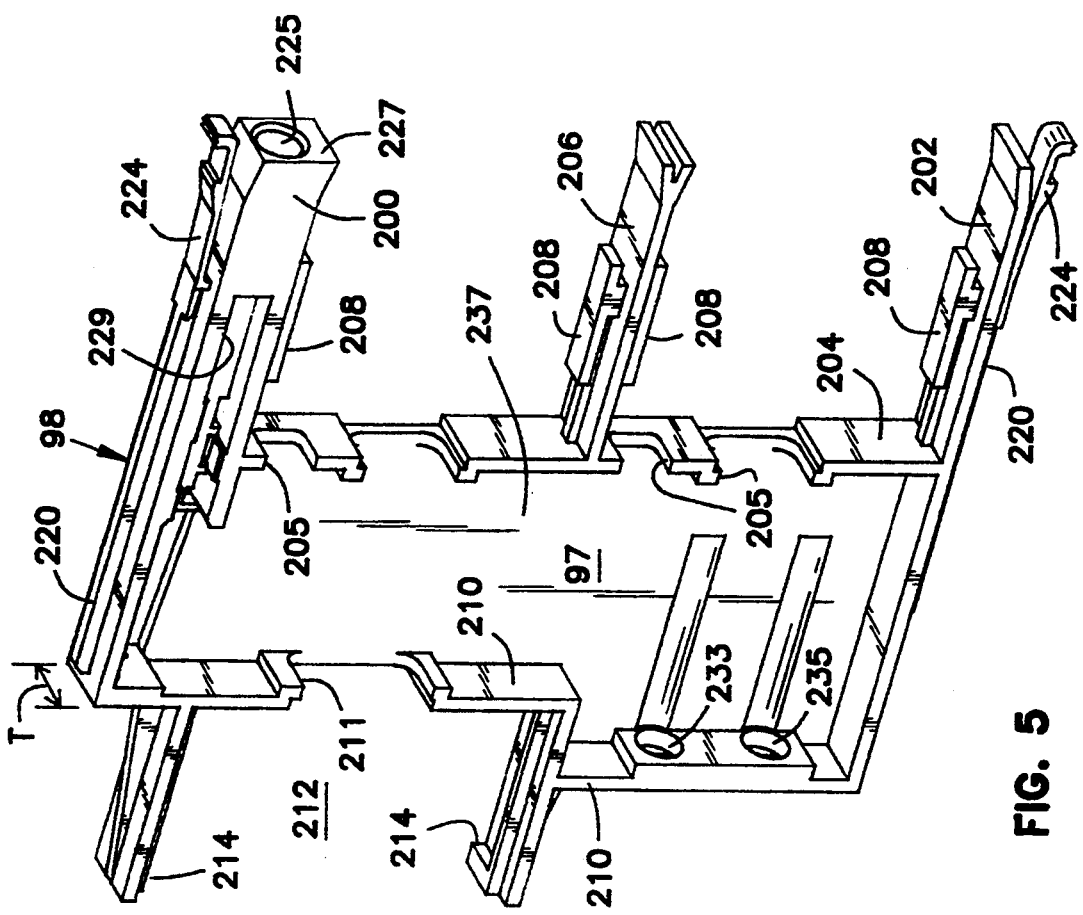
FIG. 5 is a right side, top and front perspective view of a frame for the assembly of FIG. 1.

With best reference to FIGS. 5 and 6, frame 98 is provided with a top rail 200 and a bottom rail 202. Rails 200, 202 are generally parallel and spaced apart. A vertical rail 204 joins rails 200,202 at an intermediate location of rails 200, 202. The rails 200, 202, 204 have a transverse dimension (T) approximately equal to the width of jacks 12, 12a. A third horizontal rail 206 extends from rail 204 generally parallel to rails 200, 202 and evenly spaced therebetween. Each of rails 200, 202, 206 includes plates 208 sized to be received within grooves 93 on jacks 12, 12a. Accordingly, jack 12 may be slip-fit between rails 200 and 206, and jack 12a may be slip-fit between rails 206 and 202. The rails 200, 202, 204, 206 are positioned such that the jacks 12, 12a are maintained in a vertical alignment, with the side walls of the jacks being generally coplanar.

An off-set back rail 210 is provided with a pocket 212 sized to receive the rear cross-connect module 96. Grooves 214 are formed in the pocket walls 212 sized to receive the rails 114 of the cross-connect module 96. As a result, the cross-connect module 96 may be slipped into pocket 212. The connectors 152, 154 are mounted on the rear wall 210 and exposed through ports 233, 235 on the rear wall to permit insertion of a plug into connectors 152, 154.

The rails 200, 202 have guide rails 220 formed thereon. Also, resiliently biased release tabs 224 are formed on the forward end of guide rails 220. With this structure, the frames may be inserted into a chassis (not shown), with the guide rails 220 received within preformed grooves in the chassis and with the tabs 224 locking the assembly 10 within the chassis. Accordingly, a plurality of assemblies 10 may be provided in side-by-side alignment within a chassis in a manner such as that shown in U.S. Pat. No. 4,840,568. Preferably, assemblies will be slightly spaced apart to avoid electrical contact between opposing jack modules.

Cut-outs 205 in rail 204 accommodate passage of crimps 80, 81, 80a, 81a and conductors 310, 312, 310a, 312a into the interior 97 of the frame 98. Similarly, a cutout 211 in rear wall 210 permits passages of crimps 136, 138 and conductor 169 into interior 97.

A port 225 is formed in a forward face 227 of rail 200 to receive tracer lamp 164. A cavity 229 is formed in rail 200 to receive springs 160, 162. Holes 231 are formed in rear wall to receive pins 156, 158.

A sidewall 237 extends from rail 200 to rail 202 and between rails 204, 210 to cover one side of interior 97. The entire transverse dimension T of the frame 98 is slightly greater than or equal to the width of modules 12, 12a. Accordingly, the assembly 10 is generally planar.

With the result of the foregoing structure, a DSX module assembly of enhanced density is provided. Each of the jack modules 12, 12a is a completely contained electrical unit maintained in desired spacing by the dielectric frame 98. The foregoing structure has ease of manufacture and assembly as well as an enhanced density to achieve increased performance at reduced manufacturing cost.

D. Detailed Description of Second Embodiments (Front Cross-Connect DSX)

The foregoing description shows a so-called rear cross-connect module. Namely, cross-connection is provided on the rear of the module through ports 124, 126.

Figure 14:
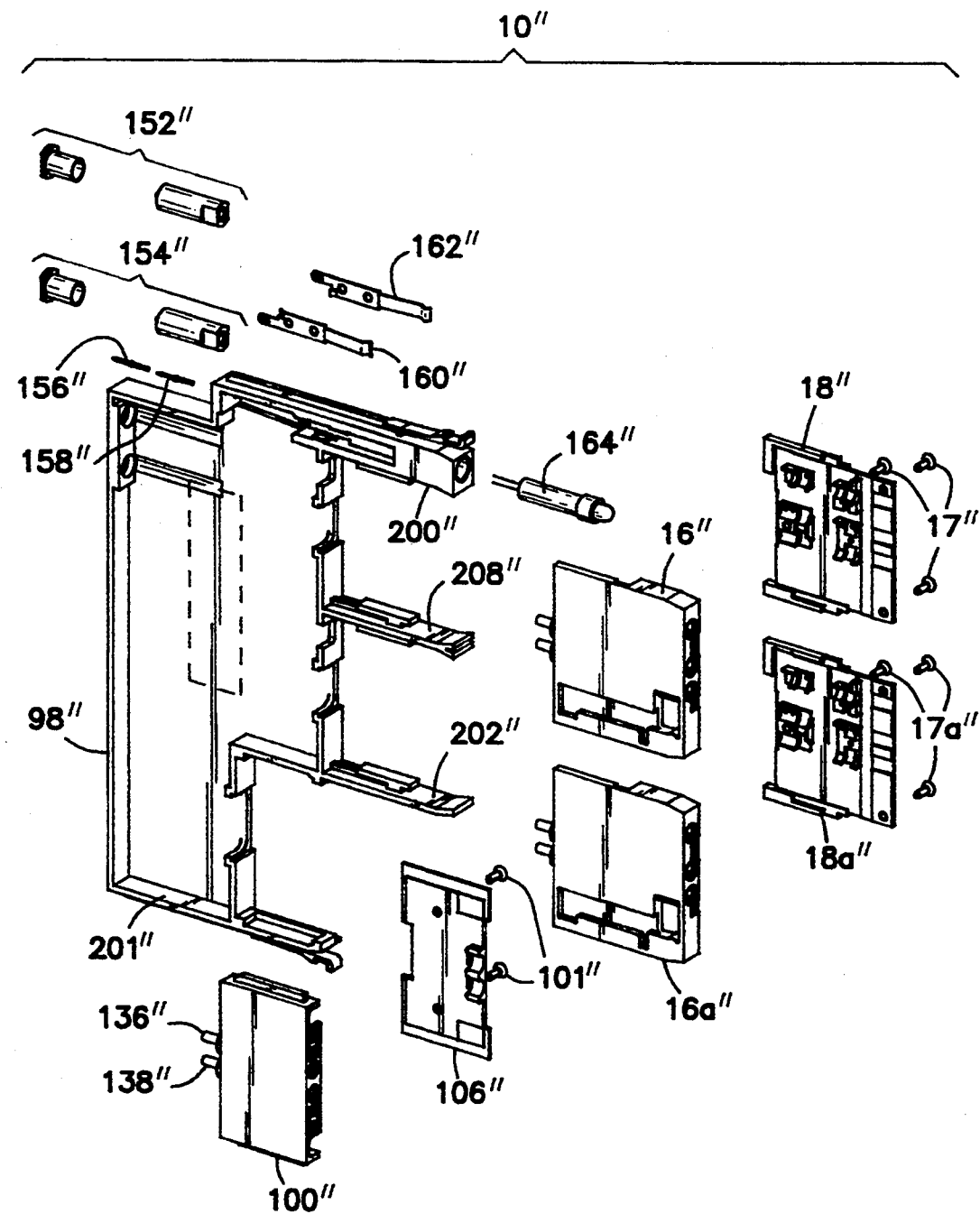
FIG. 14 is a perspective exploded view of the assembly of FIG. 13.
Figure 15:
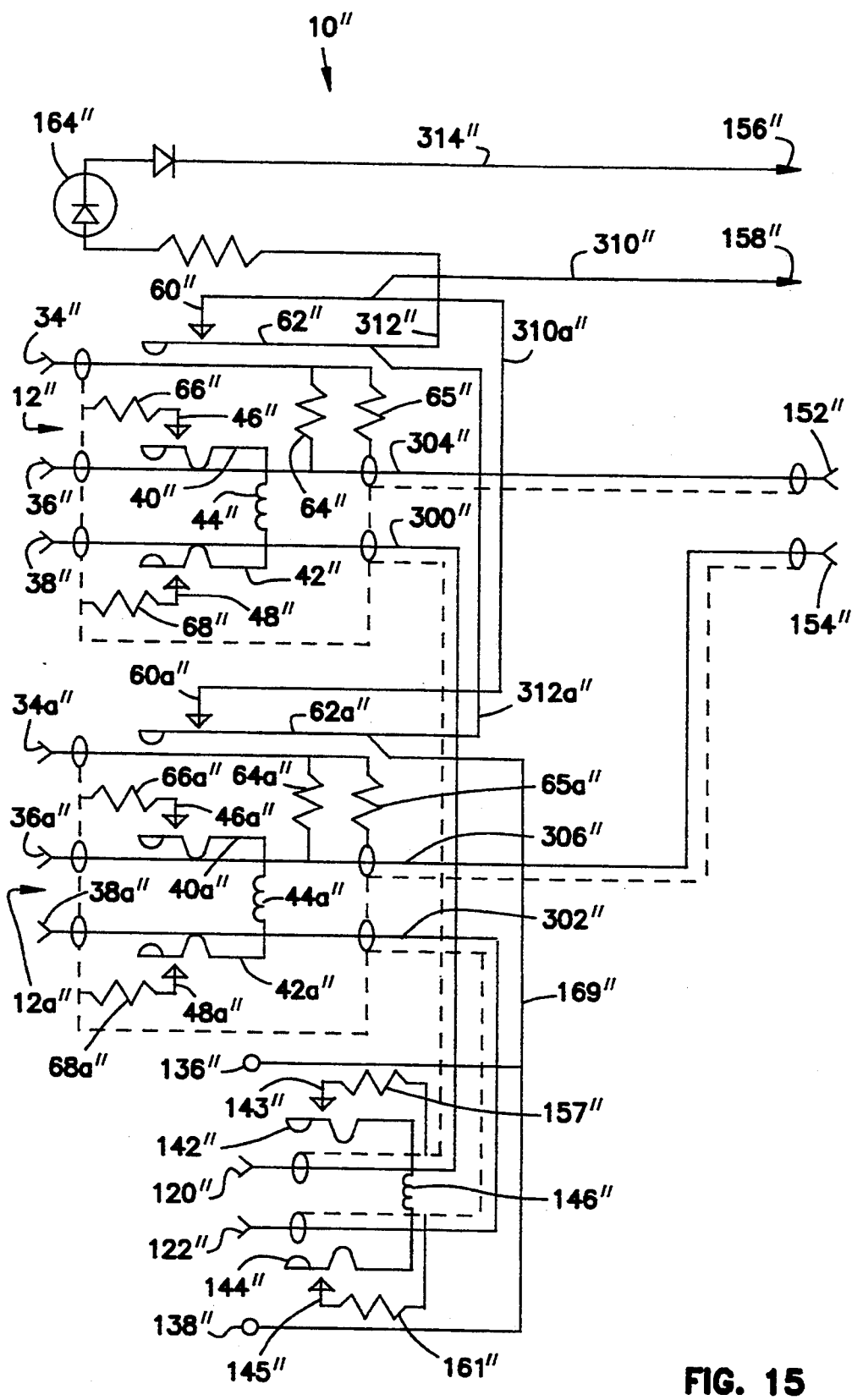
FIG. 15 is a schematic electrical view of the assembly of FIG. 13.

From time to time, it may be desirable to have cross-connection on the front of the module. Such an embodiment is shown as assembly 10″ in FIGS. 13–15. In FIGS. 13–15, all elements which are identical to those in FIG. 1 are similarly numbered except for the addition of the "″" designation.

As shown in FIG. 13, the molded dielectric frame 98″ includes the rear wall 210″, a top rail 200″ and parallel rails 208″ and 202″. Rails 202″, 208″ and 200″ are connected by an intermediate vertical rail 204″. A bottom rail 201″, parallel to rail 202″, is connected to rail 202″ by a vertical wall 203″. Rails 201″, 203″ and 202″ cooperate to define the pocket 212″ into which the cross-connect module 96″ is received. The schematic circuitry of the module 10″ (shown in FIG. 15) is identical to that shown in FIG. 4 except that cross-connect ports are accessible through the forward wall of assembly 10″.

E. Detailed Description of Third Embodiment (DDF)

1. Overall Description

The foregoing description of jack module assemblies 10, 10″ described the present invention in the embodiment of DSX jack module for cross-connect applications. In addition, the present invention may be utilized in a so-called DDF assembly.

A DDF jack module assembly is shown with initial reference to FIGS. 16 through 21. The DDF assembly 10′ includes jack modules 12′ and 12a′. Each of jack modules 12′, 12a′ is identical to jack modules 12, 12a.

2. Frame Description

Figure 16:
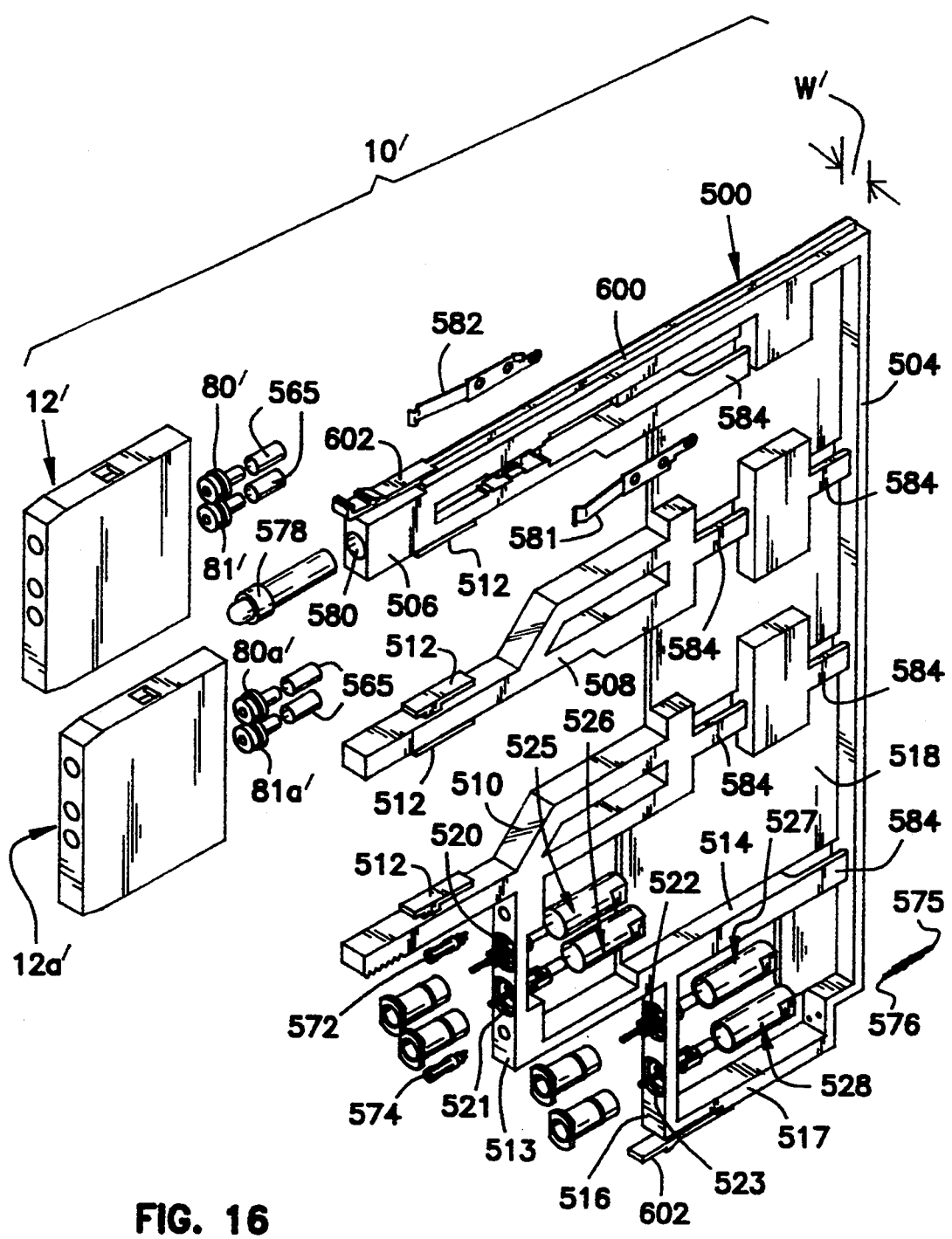
FIG. 16 is an exploded perspective view of a DDF jack module assembly according to the present invention.

In FIG. 16, the DDF jack module assembly 10′ is shown in exploded format. The assembly 10′ includes a frame 500. The frame 500 has a rear wall 504. Extending perpendicular to the rear wall 504 is a top rail 506 and intermediate rails 508, 510. Rails 506, 508 and 510 extend parallel to one another and are spaced apart to receive modules 12′, 12a′. Locking tabs 512 are carried on rails 506, 508, 510 and selected to be received within locking openings on modules 12′, 12a′.

Extending downwardly from rail 510 is a first forward facing vertical rail 513. A reinforcing rib 514 extends from vertical rail 513 to rear wall 504. Rail 513 is spaced rearwardly of the forward ends of rails 506, 508, 510. Spaced rearwardly of wall 513 is a second vertical wall 516 which is connected to rear wall 504 by a bottom wall 517.

A side plate 518 is provided on one side of the frame 500. The frame 500 is provided with a width W′, selected to be equal to the width of the modules 12′, 12a′. Accordingly, the frame 500 holds the modules 12′, 12a′ in a coplanar alignment with the assembly 10′ having a width approximately equal to the width of the modules 12′, 12a′.

3. Plug Assembly Detail

Each of walls 513, 516 are provided with vertically spaced apart openings 520–523. Each of openings 520–523 receives a plug subassembly 525–528, respectively. The plug subassemblies 525–528 are identical and a description of plug 525 shown best in FIG. 21, will suffice as a description of the other plug subassemblies.

As shown in FIG. 21, the plug subassembly 525 includes a front sleeve 530, a middle sleeve 532 and a rear sleeve 534. The sleeves are fastened with front sleeve 530 slipped onto middle sleeve 532 until sleeve 530 abuts a stop ring 536. A rear portion 532b of sleeve 532 is threaded to threadably receive rear sleeve 534 which is provided with internal threads 535.

Figure 12:
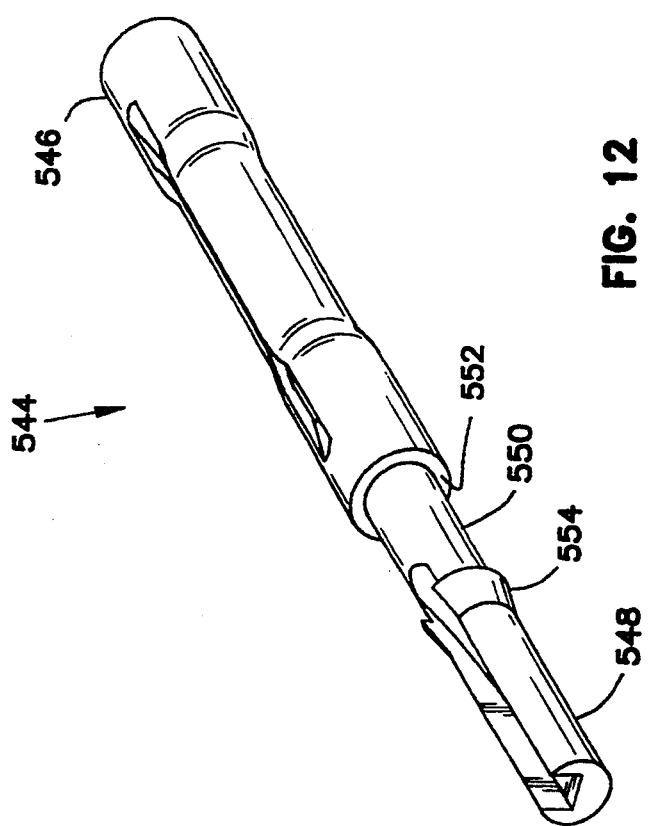
FIGS. 11 and 12 are perspective views of contact pins for use in the present invention.
Figure 11:
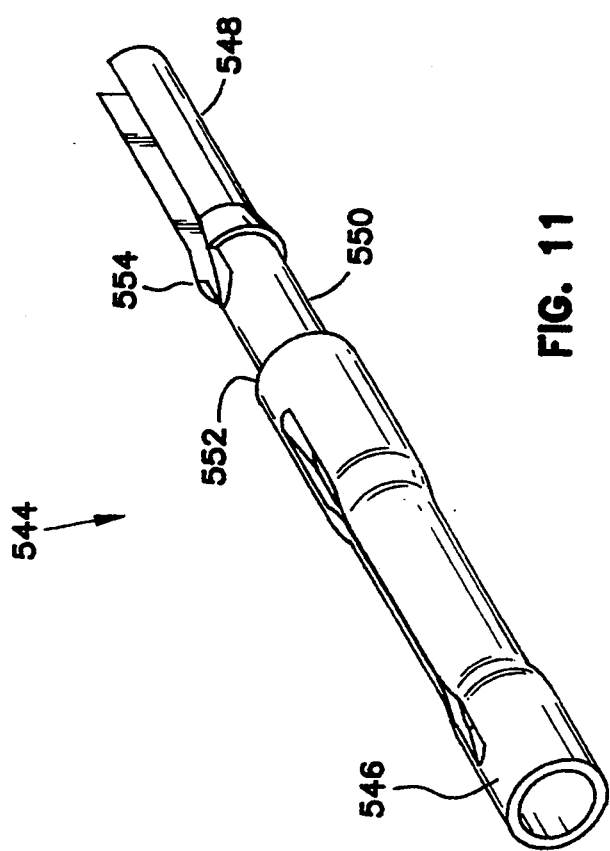

Sleeve 530 is provided with a flange 538 sized to be received within a detent 540 (see FIG. 19) formed on the wall 512 of the frame 500. The spacing between the flange 538 and the leading end 540 of rear sleeve 534 is selected to be approximate to the thickness of the walls 513, 516 such that the plug subassembly 525 is securely fastened to the wall 513 when the plug subassembly 525 is assembled. The plug subassembly 525 includes a center contact 544. The center contact 544 includes a pin receiving end 546 and a center conductor receiving end 548. Intermediate ends 546, 548 is a connecting post 550 spaced between a stop surface 552 and a rib 554 (see FIGS. 11–12).

An insulator 556 is provided for retaining the center contact 544 in coaxial alignment with sleeves 530, 532 and 534. The insulator 556 includes a central bore 557 which receives connecting portion 550 with the insulator 556 slipped over rib 554 and abutted against surface 552. The insulator 556 has radially extending ribs 559 which abut the inner surface of connector sleeve 532 when the insulator is press fit into sleeve 532.

A crimp connector 560 is provided with the plug subassembly 525. Crimp connector 560 includes a barrel portion 562 and a crimp portion 564. The barrel portion 562 is generally semi-cylindrical and is sized to be received within portion 532b of sleeve 532. So assembled, a cutout 566 of the center contact is exposed through the crimp connector 560. Accordingly, the central conductor of a coaxial cable may be placed in end 548 with solder applied to the cutout area 566. The shielded ground of the coaxial cable may be crimp connected to crimp connect portion 564 by crimp sleeves 565 (shown in FIGS. 16, 18). The outer or third sleeve 534 is then slid over the connection to complete the subassembly and provide strain relief to the coaxial cable.

Figure 19:
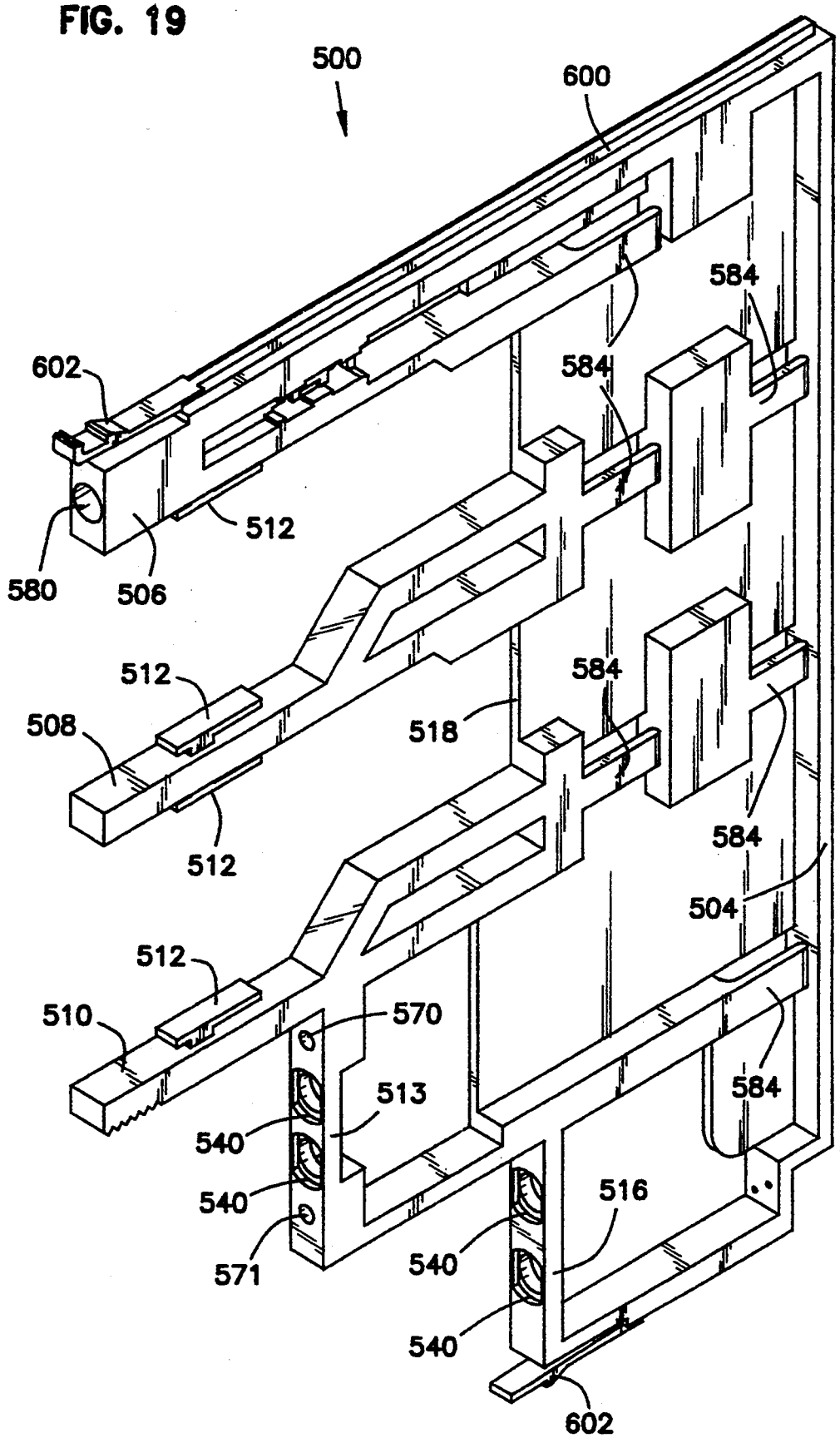
FIG. 19 is a left side, top and front perspective view of a frame for use in the assembly of FIG. 16.

Wall 513 is also provided with secondary openings 570, 571 (FIG. 19). A tracer lamp jack 572, 574 is placed in each of openings 370, 371.

Tracer lamp pins 575, 576 are mounted in rear wall 504. A tracer lamp 578 is provided to be received within an aperture 580 formed in the forward end of top rail 506. Tracer lamp springs 581, 582 are mounted in top rail 506 to engage the leads of the tracer lamp 578 as is conventional.

As shown best in FIGS. 18, 19, rails 506, 508 and 510 include resilient retaining clips 584. The retaining clips are spaced from wall 518. The clips 584 are integrally molded with the remainder of the frame 500. The clips retain cables and other wiring to ensure that the cables and wiring stay within the width W', of the frame 500.

The frame includes top and bottom guides 600 and locking tabs 602 to lock the frame in a chassis as is conventional with various modules 10' disposed in side-by-side relation. In such an embodiment, the modules 10' will be slightly spaced apart so that opposing jack modules 12' and 12a' would not be in electrical contact.

4. DDF Circuit

Figure 20:
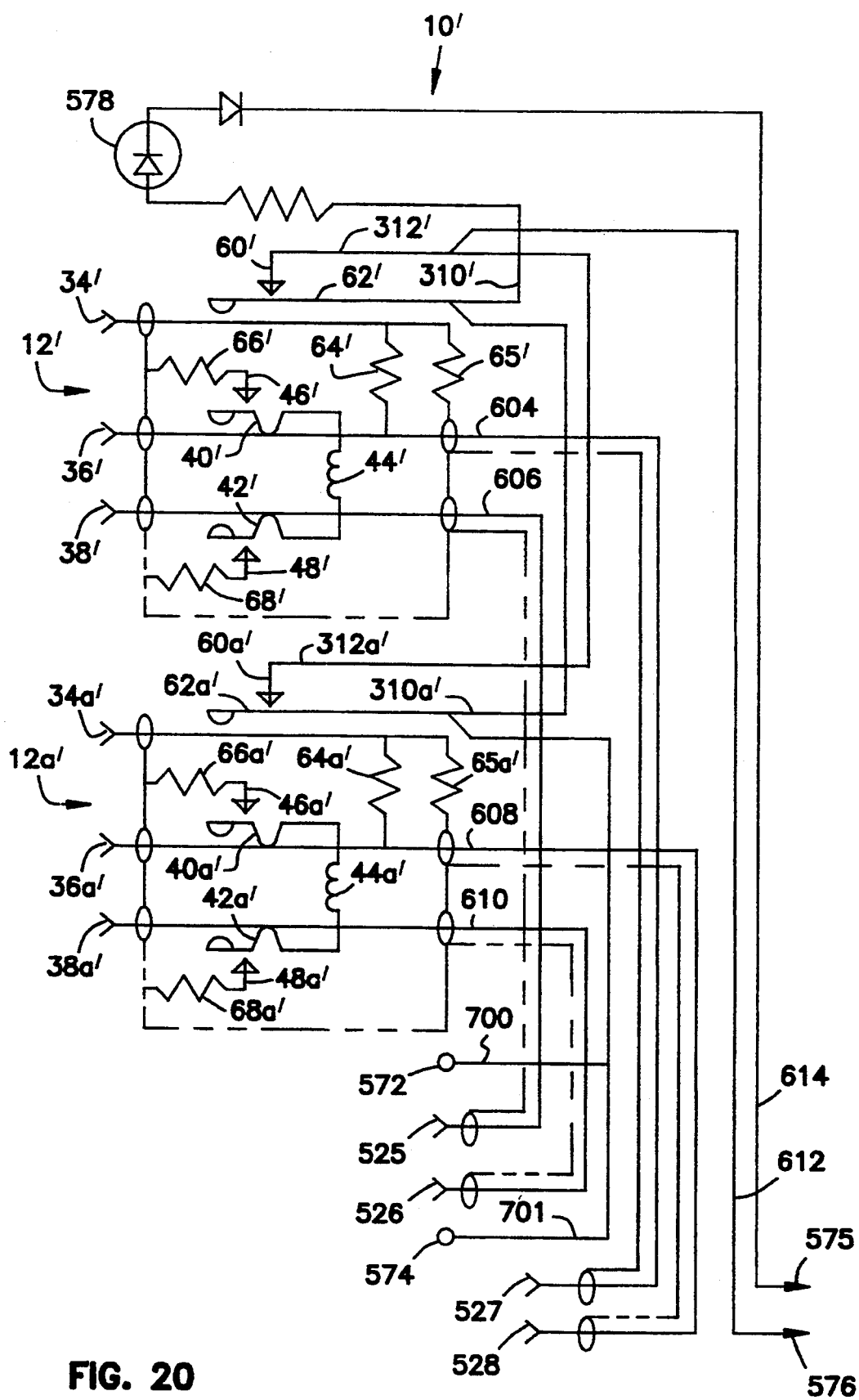
FIG. 20 is a schematic view of the electrical circuit of the assembly of FIG. 16.

FIG. 20 is an electrical schematic of the completed module. A coaxial cable 604 extends between crimp 80' and connector 527. A coaxial cable 606 extends between crimp 81' and connector 525. A coaxial cable 608 extends between crimp 80a' and connector 528. A coaxial cable 610 extends between crimp 81a' and connector 526. A conductor 612 extends from spring 582 to LED pin 575. A conductor 614 extends from spring 581 to pin 575. A conductor 310' extends from module 12' to spring 582. A conductor 312' extends from module 12' to pint 576. Similarly, conductors 310a' and 312a' extend from module 12a' to spring 582 and pin 576, respectively. Finally, conductors 700, 701 connect jacks 572, 574 with spring 582.

As will be apparent to one of ordinary skill in the art, the module 10' is a completed DDF module having normally closed contacts between the out and the auxiliary cross-connect out lines. Further, the in and the auxiliary cross-connect in lines are normally connected in the absence of a plug in the forward ports. By utilizing modules 12', 12a', the DDF assembly 10' is of substantially reduced thickness over prior coax products to greatly enhance the density of such products in a chassis.

Having described the present invention in a preferred embodiment, it can be seen how the objects of the invention have been attained. However, modifications and equivalents of the disclosed concepts, such as those which readily occur to those skilled in the art, are intended to be included within the scope of the appended claims.

What is claimed is:

1. A jack module assembly comprising:
   a. first and second jack modules, each of said jack modules having:
      i) a body of electrically conductive material having a plurality of walls including first and second spaced apart side walls, top and bottom walls, and front and rear walls, said plurality of walls cooperating to define a Jack body interior;
      ii) at least a first port formed through said front wall and sized to receive a jack plug;
      iii) first and second coax conductors disposed within said interior with said first coax conductor axially aligned with said first port such that a plug inserted within said first port will electrically connect with said first coax conductor;
      iv. first and second connectors on said rear wall axially aligned with said first and second coax conductors, respectively, with each connector including means for connection to a coax cable having a central conductor and a grounded shield, whereby said shield can be electrically connected to said body through connection to one of said connectors and said central conductor can be connected to a respective coax conductor through insertion of said central conductor into said one of said connectors;
      v) circuit means for releasably connecting the said first and second coax conductors in the absence of a plug connected to said first coax conductor and for opening said connection between said first and second coax conductors upon insertion of a plug in said first port;
   b. a molded dielectric, electrically insulating frame in which said first and second jack modules are mounted in a predetermined alignment with said first side wall of said first jack module in coplanar alignment with said first side wall of said second jack module and with connectors of both said first and second jack modules disposed within an interior of said frame and with said front walls of both of said first and second jack modules exposed to an exterior of said frame;
   said frame having a transverse dimension substantially equal to a spacing between said first and second side walls of said bodies of said jack modules;
   first, second, third and fourth coax cables disposed within said frame interior, said first coax cable connected to said first connector of said first jack module, said second coax cable connected to said second connector of said second jack module, said third coax cable connected to said first connector of said second jack module and said fourth coax cable connected to said second connector of said second jack module;
   first, second, third and fourth connection means carried on said frame within said transverse dimension with said first through fourth coax cables connected to said first through fourth connection means, respectively.

2. An assembly according to claim 1 wherein said frame includes a top rail, a bottom rail and an intermediate rail, each generally parallel and spaced apart with said first jack module received between and retained by said top and intermediate rails and with said bottom jack module retained between said bottom and intermediate rails.

3. An assembly according to claim 1 comprising means for retaining said frame in a chassis with a plurality of said frames retained in side by side parallel spaced alignment.

4. A jack module assembly comprising:
 a. first and second jack modules, each of said jack modules having:
  i) a body of electrically conductive material having a plurality of walls including first and second spaced apart side walls, top and bottom walls and front and rear walls, said plurality of walls cooperating to define a jack body interior;
  ii) at least a first port formed through said front wall and sized to receive a jack plug;
  iii) first and second coax conductors disposed within said interior with said first coax conductor axially aligned with said first port such that a plug inserted within said first port will electrically connect with said first coax conductor;
  iv) first and second connectors on said rear wall axially aligned with said first and second coax conductors, respectively, with each connector including means for connection to a coax cable having a central conductor, whereby said central conductor can be connected to a respective coax conductor through insertion of said central conductor into one of said connectors;
  v) circuit means for releasably connecting the said first and second coax conductors in the absence of a plug connected to said first coax conductor and for opening said connection between said first and second coax conductors upon insertion of a plug in said first port;
 b. a molded dielectric frame in which said first and second jack modules are mounted in a predetermined alignment with said first side wall of said first jack module in coplanar alignment with said first side wall of said second jack module and with connectors of both said first and second jack modules disposed within an interior of said frame and with said front walls of both of said first and second jack modules exposed to an exterior of said frame;
 said frame having a transverse dimension substantially equal to a spacing between said first and second side walls of said bodies of said jack modules;
 first, second, third and fourth coax cables disposed within said frame interior, said first coax cable connected to said first connector of said first jack module, said second coax cable connected to said second connector of said first jack module, said third coax cable connected to said first connector of said second jack module and said fourth coax cable connected to said second connector of said second jack module;
 first, second, third and fourth connection means carried on said frame within said transverse dimension with said first through fourth cables connected to said first through fourth connection means, respectively;
 said frame including a top rail, a bottom rail and an intermediate rail, each generally parallel and spaced apart with said first jack module received between and retained by said top and intermediate rails and with said second jack module retained between said bottom and intermediate rails;
 a tracer lamp carried on at least one of said rails and retained within said transverse dimension.
5. A jack module assembly comprising:
 a first and second jack modules, each of said jack modules having:
  i) a body of electrically conductive material having a plurality of walls including first and second spaced apart side walls, top and bottom walls, and front and rear walls, said plurality of walls cooperating to define a jack body interior;
  ii) at least a first port formed through said front wall and sized to receive a jack plug;
  iii) first and second coax conductors disposed within said interior with said first coax conductor axially aligned with said first port such that a plug inserted within said first port will electrically connect with said first coax conductor;
  iv) first and second connectors on said rear wall axially aligned with said first and second coax conductors, respectively, with each connector including means for connection to a coax cable having a central conductor and a grounded shield, whereby said shield can be electrically connected to said body through connection to one of said connectors and said central conductor can be connected to a respective coax conductor through insertion of said central conductor into said one of said connectors;
  v) circuit means for releasably connecting the said first and second coax conductors in the absence of a plug connected to said first coax conductor and for opening said connection between said first and second coax conductors upon insertion of a plug in said first port;
 b. a molded dielectric frame in which said first and second jack modules are mounted in a predetermined alignment with said first side wall of said first jack module in coplanar alignment with said first side wall of said second jack module and with connectors of both said first and second jack modules disposed within an interior of said frame and with said front walls of both of said first and second jack modules exposed to an exterior of said frame;
 said frame having a transverse dimension substantially equal to a space between said first and second side walls of said bodies of said jack modules;
 first, second, third and fourth coax cables disposed within said frame interior, said first coax cable connected to said first connector of said first jack module, said second coax cable connected to said second connector of said first jack module, said third coax cable connected to said first connector of said second jack module and said fourth coax cable connected to said second connector of said second jack module;
 first, second, third and fourth connection means carried on said frame within said transverse dimension with said first through fourth cables connected to said first through fourth connection means, respectively,
 c. a cross-connect module having a transverse dimension not greater than said transverse dimension of said frame and means for retaining said cross-connect module on said frame within said transverse dimension of said frame.
6. An assembly according to claim 5 wherein said cross-connect module including circuit means and an exposed wall having first and second cross-connect ports, each port adapted for receiving a plug.
7. An assembly according to claim 6 wherein said first and second connection means are carried on said cross-connect module and exposed to an interior of said frame, and wherein said cross-connect module further includes first cross-connect conductor means for electrically connecting said first cross-connect port to said first connection means, second cross-connect conductor means for electrically connecting said second cross-connect port to said second connection means, and means for releasably connecting said first and second cross-connect conductor means in the absence of a plug in either of said first and second cross-connect ports and for opening said connection upon insertion of a plug into either of said first and second cross-connect ports.

8. An assembly according to claim 7 wherein said third and fourth connection means include first and second connection ports on said frame exposed to an exterior of said frame and plug receiving subassemblies carried on said frame and aligned with said connection ports, each of said subassemblies adapted for receiving a plug, said subassemblies being retained within said transverse dimension.

9. A jack module assembly comprising:
 a. first and second jack modules, each having:
  i) an electrically conductive body having a plurality of walls including a top wall, a bottom wall, a front wall, a rear wall and generally parallel spaced apart side walls;
  ii) at least a first port formed through said front wall and sized to receive a jack plug;
  iii) first and second coax connectors on said rear wall with each connector having means for connection to a coax conductor having a central conductor and a ground shield, wherein said ground shield can be electrically connected to said body upon connection of said coax conductor to either of said first and second coax connectors;
  iv) circuit means contained within said body for electrically connecting said connectors in the absence of a plug inserted into said first port and for opening said connection upon insertion of a plug into said first port;
 b. a molded dielectric, electrically insulating frame in which said jack modules are mounted, said frame comprising:
  i) a top rail and a spaced apart bottom rail;
  ii) means for supporting said first and second jack modules between said top and bottom rails with said first and second jack modules in generally co-planar alignment and with said jack modules maintained in electrically insulated separation; and with said front walls of each of said first and second jack modules exposed to an exterior of said frame, and with at least one of said first and second sidewalls of said bodies of each of said first and second jack modules exposed to an exterior of said frame;
  iii) said frame having a frame interior with first, second, third and fourth coax conductors disposed within said interior, said first coax conductor connected to said first connector of said first jack module, said second coax conductor connected to said second connector of said first jack module, said third coax conductor connected of said first jack module, said third coax conductor connected to said first connector of said second jack module and said fourth coax conductor connected to said second connector of said second jack module;
 c. first, second, third and fourth coax connection means secured to said frame and disposed within said frame interior and accessible from an exterior of said frame; said first through fourth coax connection means connected to said first through coax conductors, respectively.

* * * * *